US012328180B2

(12) United States Patent
Song et al.

(10) Patent No.: US 12,328,180 B2
(45) Date of Patent: Jun. 10, 2025

(54) METHOD FOR PREDICTING CO-CHANNEL INTERFERENCE OF SATELLITE-TO-GROUND DOWNLINK UNDER LOW-ORBIT SATELLITE CONSTELLATION

(71) Applicant: Zhejiang University, Zhejiang (CN)

(72) Inventors: Chunyi Song, Zhoushan (CN); Yuying Xu, Zhoushan (CN); Qin Chen, Zhoushan (CN); Zhiwei Xu, Zhoushan (CN)

(73) Assignee: Zhejiang University, Zhejiang (CN)

( * ) Notice: Subject to any disclaimer, the term of this patent is extended or adjusted under 35 U.S.C. 154(b) by 734 days.

(21) Appl. No.: 17/637,308

(22) PCT Filed: Jun. 12, 2020

(86) PCT No.: PCT/CN2020/095824
§ 371 (c)(1),
(2) Date: Feb. 22, 2022

(87) PCT Pub. No.: WO2021/036414
PCT Pub. Date: Mar. 4, 2021

(65) Prior Publication Data
US 2022/0286199 A1 Sep. 8, 2022

(30) Foreign Application Priority Data
Aug. 29, 2019 (CN) .......................... 201910806319.6

(51) Int. Cl.
*H04B 7/185* (2006.01)
*H04B 17/336* (2015.01)
(Continued)

(52) U.S. Cl.
CPC ....... *H04B 7/18513* (2013.01); *H04B 17/336* (2015.01); *H04B 17/373* (2015.01); *H04B 17/3913* (2015.01)

(58) Field of Classification Search
CPC ............. H04B 7/18513; H04B 17/336; H04B 17/373; H04B 17/3913; H04B 17/345; H04B 17/40; H04W 52/243; H04W 52/42
See application file for complete search history.

(56) References Cited

U.S. PATENT DOCUMENTS

| 2010/0123621 A1 | 5/2010 | Craig et al. | |
| 2021/0167907 A1* | 6/2021 | Ding | H04W 72/541 |
| 2021/0194733 A1* | 6/2021 | Huangfu | G06N 3/084 |

FOREIGN PATENT DOCUMENTS

| CN | 1678120 A | 10/2005 |
| CN | 108712202 A | 10/2018 |

(Continued)

OTHER PUBLICATIONS

International Search Report for PCT/CN2020/095824 Dated Aug. 20, 2020.

*Primary Examiner* — Fred A Casca
(74) *Attorney, Agent, or Firm* — Porus IP LLC

(57) ABSTRACT

The present disclosure provides a method for predicting co-channel interference (CCI) of a satellite-to-ground downlink under a low-orbit satellite constellation. The method includes: obtaining CCI values in a first time period and CCI values in a second time period; constructing a CCI model based on the CCI values in the first time period and a dropout wavelet neural network (WNN); updating parameters of the CCI model; inputting the CCI values in the second time period into an updated CCI model to obtain accuracy; determining whether the accuracy is greater than an accuracy threshold; and if the accuracy is greater than the accuracy threshold, reconstructing the CCI model; or if the (Continued)

accuracy is less than or equal to the accuracy threshold, outputting the updated CCI model; and predicting CCI values of each link at a next moment based on the updated CCI model.

7 Claims, 2 Drawing Sheets

(51) Int. Cl.
*H04B 17/373* (2015.01)
*H04B 17/391* (2015.01)

(56) References Cited

FOREIGN PATENT DOCUMENTS

| | | | |
|---|---|---|---|
| CN | 108777872 A | 11/2018 |
| CN | 110022182 A | 7/2019 |
| CN | 110601777 A | 12/2019 |

\* cited by examiner

METHOD FOR PREDICTING CO-CHANNEL INTERFERENCE OF SATELLITE-TO-GROUND DOWNLINK UNDER LOW-ORBIT SATELLITE CONSTELLATION

The present application is a National Stage application of International Patent Application No. PCT/CN2020/095824, filed on Jun. 12, 2020, which claims priority to the Chinese Patent Application No. 201910806319.6, filed with the China National Intellectual Property Administration (CNIPA) on Aug. 29, 2019, and entitled "METHOD FOR PREDICTING CO-CHANNEL INTERFERENCE OF SATELLITE-TO-GROUND DOWNLINK UNDER LOW-ORBIT SATELLITE CONSTELLATION", each of which is incorporated herein by reference in its entirety.

TECHNICAL FIELD

The present disclosure relates to the technical field of satellite communications, and in particular, to a method for predicting co-channel interference (CCI) of a satellite-to-ground downlink under a low-orbit satellite constellation.

BACKGROUND

Satellite communication is an important information transmission means in contemporary society. With development of the times, demands for communication are increasing, and scenarios of two ends in communication are increasingly complicated. Low earth orbit (LEO) satellites use multi-beam technologies to implement co-frequency multiplexing, so as to improve channel resource utilization. However, in a communication process, LEO multi-beam control is highly complicated, and it is easy to cause co-channel interference (CCI). CCI value prediction and estimation for different communication links can be applied in many different scenarios, especially for selecting an appropriate link switching criterion when there are many communication links between a satellite and a terminal.

At present, there are three main types of algorithms for predicting complicated time series with randomness and sudden changes. The first one is a qualitative prediction method in which prediction is performed through analogy, comparison, etc. by analyzing the characteristic and status of a predicted object. The second one is a causality prediction method in which statistics collection and prediction are performed on a target time series and an impact factor series based on causal relationships. The third one is a time series prediction method in which series predication is performed based on the change law of the time series by using some mature algorithms, such as autoregressive model (AR), artificial nerve network (ANN), and Kalman filter. In practical application, the first and second methods lead to a large amount of data and complicated calculation. At present, the third method is more frequently used for predication, but it also leads to complicated calculation.

SUMMARY

In view of this, the present disclosure aims to provide a method for predicting co-channel interference (CCI) of a satellite-to-ground downlink under a low-orbit satellite constellation, so as to improve a speed of CCI value prediction.

To achieve the objective, the present disclosure provides a method for predicting CCI of a satellite-to-ground downlink under a low-orbit satellite constellation.

The method includes:

S1: obtaining CCI values in a first time period and CCI values in a second time period;

S2: constructing a CCI model based on the CCI values in the first time period and a dropout wavelet neural network (WNN);

S3: updating parameters of the CCI model;

S4: inputting the CCI values in the second time period into an updated CCI model to obtain accuracy;

S5: determining whether the accuracy is greater than an accuracy threshold; and if the accuracy is greater than the accuracy threshold, going back to "S2"; or if the accuracy is less than or equal to the accuracy threshold, outputting the updated CCI model; and S6: predicting CCI values of each link at a next moment based on the updated CCI model.

Optionally, the obtaining CCI values in a first time period specifically includes:

S1.1: obtaining the CCI values in the first time period by using a satellite; or S1.2: obtaining the CCI values in the first time period through modeling.

Optionally, the constructing a CCI model based on the CCI values in the first time period and a dropout WNN specifically includes:

S2.1: establishing an input layer, a hidden layer, and an output layer based on a dropout three-layer WNN;

S2.2: initializing the total number l of hidden-layer nodes, the total number m of output-layer nodes, a dropout probability p, a connection weight $v_i$, corresponding to a jth hidden-layer node, between an input-layer neuron and a hidden-layer neuron, a connection weight $w_j$, corresponding to a kth output-layer node and the jth hidden-layer node, between the hidden-layer neuron and an output-layer neuron, a hidden-layer threshold $\alpha_i$ corresponding to the jth hidden-layer node and an ith input-layer node, and an output-layer threshold $b_j$ corresponding to the kth output-layer node and the jth hidden-layer node, and initializing a learning rate $\eta$ and a neuron excitation function $f(x)=e^{-x^2/2}\cdot\cos(1.75x)$, using $X=(x_1, x_2, \ldots, x_n)^T$ as input;

S2.3: determining an input quantity corresponding to each hidden-layer node based on the CCI values in the first time period, where a specific formula is $$net_j = \sum_{i=1}^{n}(v_i \cdot x_i + a_i), j = 1, 2, \cdots, l, \quad (3)$$

$net_j$ denotes an input quantity corresponding to the jth hidden-layer node, $x_i$ denotes the ith CCI value corresponding to the jth hidden-layer node, and n denotes the total number of CCI values in the first time period;

S2.4: calculating an actual output quantity corresponding to each hidden-layer node, where a specific calculation formula is $y_j=f(net_j)=e^{-net_j^2/2}\cdot\cos(1.75net_j)$ (4), where $y_j$ denotes an actual output quantity corresponding to the jth hidden-layer node;

S2.5: calculating an input quantity corresponding to each output-layer node, where a specific formula is $$\begin{cases} \tilde{y}_j = r_j * y_j \\ net_k = \sum_{j=1}^{l}(w_j \cdot \tilde{y}_j + b_j), k = 1, 2, \cdots, m \end{cases} \quad (5)$$

where $\bar{y}_j$ denotes a dropout output quantity, $r_j$ denotes a vector of 0 and 1 randomly generated with probability p, and net denotes an input quantity corresponding to the kth output-layer node; and S2.6: calculating an actual output quantity corresponding to each output-layer node, where the actual output quantity corresponding to the output-layer node is a predicted CCI value, and a specific formula for calculating the actual output quantity corresponding to each output-layer node is:

$$o_k = f(net_k) = e^{-net_k^2/2} \cdot \cos(1.75 net_k) \quad (6), \text{where}$$

$o_k$ denotes the actual output quantity corresponding to the kth output-layer node, that is, a kth predicted CCI value.

According to specific embodiments of the present disclosure, the present disclosure discloses the following technical effects:

The present disclosure discloses a method for predicting CCI of a satellite-to-ground downlink under a low-orbit satellite constellation. The method includes: obtaining CCI values in a first time period and CCI values in a second time period; constructing a CCI model based on the CCI values in the first time period and a dropout WNN; updating parameters of the CCI model; inputting the CCI values in the second time period into an updated CCI model to obtain accuracy; determining whether the accuracy is greater than an accuracy threshold; and if the accuracy is greater than the accuracy threshold, reconstructing the CCI model; or if the accuracy is less than or equal to the accuracy threshold, outputting the updated CCI model; and predicting CCI values of each link at a next moment based on the updated CCI model.

In the present disclosure, the CCI values are predicted based on the dropout WNN. This not only reduces algorithm complexity, but also effectively improves a prediction speed.

BRIEF DESCRIPTION OF DRAWINGS

To illustrate the embodiments of the present disclosure or the technical solutions of the prior art more clearly, the accompanying drawings to be used in the embodiments are described briefly below. Apparently, the described accompanying drawings merely illustrates some embodiments of the present disclosure, and a person of ordinary skill in the art can further obtain other accompanying drawings based on these accompanying drawings without creative efforts.

DETAILED DESCRIPTION

The following clearly and completely describes the technical solutions in the embodiments of the present disclosure with reference to accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a method for predicting co-channel interference (CCI) of a satellite-to-ground downlink under a low-orbit satellite constellation, so as to improve a speed of CCI value prediction.

To make the foregoing objective, features, and advantages of the present disclosure clearer and more comprehensible, the present disclosure is further described in detail below with reference to the accompanying drawings and specific implementations.

The present disclosure provides a method for predicting CCI of a satellite-to-ground downlink under a low-orbit satellite constellation. The method includes the following steps:

S1: obtain CCI values in a first time period and CCI values in a second time period;

S2: construct a CCI model based on the CCI values in the first time period and a dropout wavelet neural network (WNN);

S3: update parameters of the CCI model;

S4: input the CCI values in the second time period into an updated CCI model to obtain accuracy;

S5: determine whether the accuracy is greater than an accuracy threshold; and if the accuracy is greater than the accuracy threshold, go back to "S2"; or if the accuracy is less than or equal to the accuracy threshold, output the updated CCI model; and S6: predict CCI values of each link at a next moment based on the updated CCI model.

Each step is described in detail below.

The obtaining CCI values in a first time period in S1 specifically includes the following step:

S1.1: obtain the CCI values in the first time period by using a satellite; or

S1.2: obtain the CCI values in the first time period through modeling.

Figure 1:
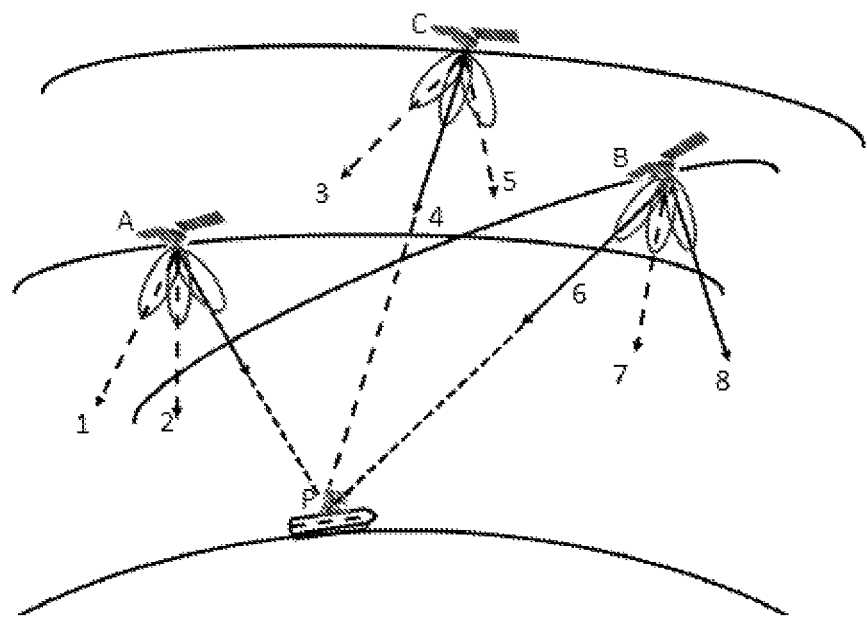
FIG. 1 is a schematic diagram of all interference paths in a low-orbit satellite communication network according to an embodiment of the present disclosure.

The obtaining the CCI values in the first time period and the CCI values in the second time period through modeling in S1.2 specifically includes the following steps:

S1.2.1: analyze a movement relationship between a satellite phased array and a terminal phased array to determine deviation angles, where the deviation angles include a deviation angle of each interference beam relative to a normal direction of the satellite phased array and a deviation angle of a receive antenna of the terminal phased array in a direction of each interference beam; and serial numbers 1 to 8 in FIG. 1 denote interference beams.

S1.2.2: calculate a CCI value caused by each interference beam based on the deviation angles. A specific formula is $$CCI_q(t) = P_T \cdot G_{ts}(\varphi_{q1}(t)) \cdot G_{re}((\varphi_{q2}(t)) \cdot (d_q(t))^{-\alpha} \quad (1).$$

In formula (1), $CCI_q(t)$ denotes a CCI value caused by a qth interference beam, $P_T$ denotes transmit power of a satellite that can generate an interference beam, $\varphi_{q1}(t)$ denotes a deviation angle of the qth interference beam relative to the normal direction of the satellite phased array, $\varphi_{q2}(t)$ denotes a deviation angle of the receive antenna of the terminal phased array in a direction of the qth interference beam, $G_{ts}(\varphi_{q1}(t))$ denotes an off-axis gain of a transmit antenna of the satellite that can generate an interference beam, $G_{re}(\varphi_{q2}(t))$ denotes an off-axis gain of the receive antenna of the terminal phased array, $d_q(t)$ denotes a distance from the qth interference beam of the satellite phased array to the terminal phased array, and a denotes a spatial attenuation factor.

S1.2.3: calculate the sum of CCI values caused by all interference beams, and determine CCI values that are caused by all interference beams and that are received by a target beam. A specific formula is $$CCI(t) = \sum_{q=1}^{N} CCI_q(t). \qquad (2)$$

In formula (2), N denotes the total number of interference beams.

Figure 2:
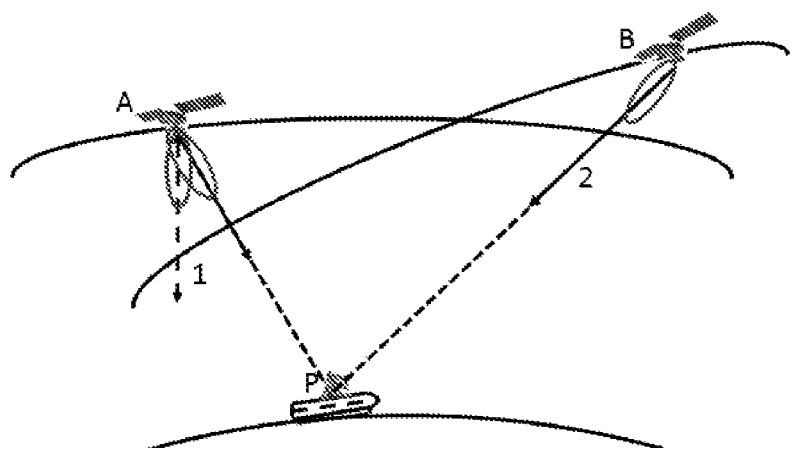
FIG. 2 is a schematic diagram of a low-orbit satellite communication network affected by two interference beams according to an embodiment of the present disclosure.

As shown in FIG. 2, for example, i=2, that is, two interference beams affect a communication link. In this case, the total CCI value may be $$CCI(t)=CCI_1(t)+CCI_2(t)=P_T \cdot G_{ts}(\varphi_{11}(t)) \cdot G_{re}(\varphi_{12}(t)) \cdot (d_1(t))^{-\alpha} + P_T \cdot G_{ts}(\varphi_{21}(t)) \cdot G_{re}(\varphi_{22}(t)) \cdot (d_2(t))^{-\alpha}$$

Figure 3:
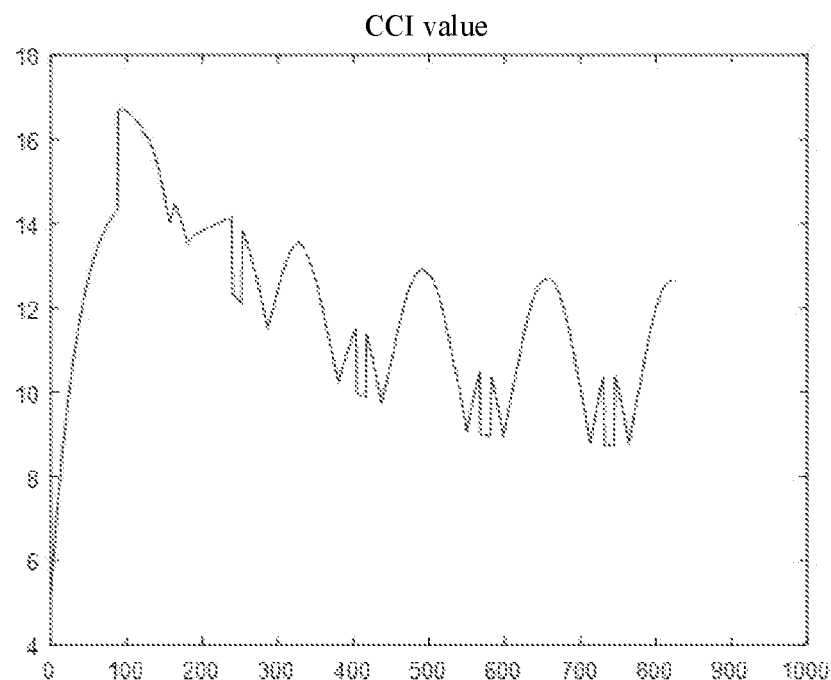
FIG. 3 is diagram of CCI simulation data obtained under two interference paths according to an embodiment of the present disclosure.

CCI values shown in FIG. 3 may be obtained through simulation.

S1.2.4: save the CCI values that are caused by all interference beams and that are received by the target beam as an array. That is, the CCI values in the first time period is $X=(x_1, x_2, \ldots, x_n)^T$. In the formula, $x_1$=CCI $(t_0)$, $x_2$=CCI $(t_0+\Delta t)$, and similarly, $x_n$=CCI $(t_0+(n-1)\Delta t)$.

In the formulas, $t_0$ denotes an initial moment, n denotes the total number of CCI values in the first time period, $\Delta t$ denotes a sampling time, and CCI $(t_0+(n-1)\Delta t)$ denotes the CCI values that are caused by all interference beams and that are received by the target beam at moment $t_0+(n-1)\Delta t$.

Steps for obtaining the CCI values in the second time period and the CCI values in the third time period are the same as the steps for obtaining the CCI values in the first time period. For details, see S1.2.1 to S1.2.4.

That is, the CCI values in the second time period are calculated as follows: $Y=(y_1, y_2, \ldots, y_s)^T$, and the CCI values in the third time period is calculated as follows: $Z=(z_1, z_2, \ldots, z_u)^T$. In the formulas, $y_1$=CCI$(t_0+n\Delta t)$, $y_2$=CCI$(t_0+(n+1)\Delta t)$, and similarly, $y_m$=CCI$(t_0+(n+s-1)\Delta t)$; $z_1$=CCI$(t_0+(n+s)\Delta t)$, $z_2$=CCI$(t_0+(n+s+1)\Delta t)$, and similarly, $z_u$=CCI$(t_0+(n+s+u-1)\Delta t)$, where n denotes the total number of CCI values in the first time period, s denotes the total number of CCI values in the second time period, and u denotes the total number of CCI values in the third time period.

The constructing a CCI model based on the CCI values in the first time period and a dropout WNN in S2 specifically includes the following steps:

S2.1: establish an input layer, a hidden layer, and an output layer based on a dropout three-layer WNN;

S2.2: initialize the total number l of hidden-layer nodes, the total number m of output-layer nodes, a dropout probability p, a connection weight $v_1$, corresponding to a jth hidden-layer node, between an input-layer neuron and a hidden-layer neuron, a connection weight $w_j$, corresponding to a kth output-layer node and the jth hidden-layer node, between the hidden-layer neuron and an output-layer neuron, a hidden-layer threshold $\alpha_i$ corresponding to the jth hidden-layer node and an ith input-layer node, and an output-layer threshold $b_j$, corresponding to the kth output-layer node and the jth hidden-layer node, and initialize a learning rate η and a neuron excitation function $f(x)=e^{-x^2/2} \cdot \cos(1.75x)$, using $X=(x_1, x_2, \ldots, x_n)^T$ as input.

S2.3: determine an input quantity corresponding to each hidden-layer node based on the CCI values in the first time period. A specific formula is $$net_j = \sum_{i=1}^{n}(v_i \cdot x_i + a_i), j = 1, 2, \cdots, l. \qquad (3)$$

In formula (3), $net_j$ denotes an input quantity corresponding to the jth hidden-layer node, l denotes the total number of hidden-layer nodes, $v_i$ denotes the connection weight, corresponding to the jth hidden-layer node, between the input-layer neuron and the hidden-layer neuron, $x_i$ denotes the ith CCI value corresponding to the jth hidden-layer node, $\alpha_i$ denotes the hidden-layer threshold corresponding to the jth hidden-layer node and the ith CCI value, and n denotes the total number of CCI values in the first time period.

S2.4: calculate an actual output quantity corresponding to each hidden-layer node. A specific calculation formula is $$y_j = f(net_j) = e^{-net_j^2/2} \cdot \cos(1.75 net_j) \qquad (4).$$

In formula (4), $y_j$ denotes an actual output quantity corresponding to the jth hidden-layer node, and $f()$ denotes the neuron excitation function.

S2.5: calculate an input quantity corresponding to each output-layer node. A specific formula is $$\begin{cases} \tilde{y}_j = r_j * y_j \\ net_k = \sum_{j=1}^{l}(w_j \cdot \tilde{y}_j + b_j), k = 1, 2, \cdots, m \end{cases} \qquad (5)$$

In formula (5), $\tilde{y}_j$ denotes a dropout output quantity, $r_j$~Bernoulli(p), Bernoulli(p) denotes a vector of 0 and 1 randomly generated with probability p, $net_k$ denotes an input quantity corresponding to the kth output-layer node, $w_j$ denotes the connection weight, corresponding to the kth output-layer node and the jth hidden-layer node, between the hidden-layer neuron and the output-layer neuron, b denotes the output-layer threshold corresponding to the kth output-layer node and the jth hidden-layer node, and m denotes the total number of output-layer nodes.

S2.6: calculate an actual output quantity corresponding to each output-layer node. The actual output quantity corresponding to the output-layer node is a predicted CCI value.

A specific formula for calculating the actual output quantity corresponding to each output-layer node is $$o_k = f(net_k) = e^{-net_k^2/2} \cdot \cos(1.75 net_k) \qquad (6).$$

In formula (6), $o_k$ denotes the actual output quantity corresponding to the kth output-layer node, that is, a kth predicted CCI value.

The updating parameters of the CCI model in S3 specifically includes the following steps:

S3.1: calculate an output error corresponding to each CCI value. A specific formula is $$e_k = d_k - o_k \qquad (7).$$

In formula (7), $e_k$ denotes an output error corresponding to a kth CCI value, and $d_k$ denotes the kth CCI value.

S3.2: update $v_i$, $w_j$, $\alpha_i$, and $b_j$ based on the output error $e_k$. A specific formula is $$\begin{cases} v'_i = v_i + \eta \cdot y_j(1-y_j)x_i \sum_{j=1}^{m} w_j \cdot e_k \\ w'_j = w_j + \eta \cdot y_j \cdot e_k \\ a'_i = a_i + \eta \cdot y_j(1-y_j) \sum_{j=1}^{m} w_j \cdot e_k \\ b'_j = b_j + e_k \end{cases} \quad (8)$$

In formula (8), $v'_i$ denotes an updated connection weight, corresponding to the jth hidden-layer node, between the input-layer neuron and the hidden-layer neuron, $w'_j$ denotes an updated connection weight, corresponding to the kth output-layer node and the jth hidden-layer node, between the hidden-layer neuron and the output-layer neuron, $a'_i$ denotes an updated hidden-layer threshold corresponding to the jth hidden-layer node and the ith CCI value, $b'_j$ denotes an updated output-layer threshold corresponding to the kth output-layer node and the jth hidden-layer node, and $\eta$ denotes the given learning rate.

The inputting the CCI values in the second time period into an updated CCI model to obtain accuracy in S4 specifically includes the following steps:
  S4.1: input the CCI values in the second time period into the updated CCI model to obtain predicted CCI values in a third time period;
  S4.2: obtain CCI values in the third time period;
  S4.3: calculate a difference between the CCI values in the third time period and the predicted CCI values in the third time period to obtain a plurality of error values; and
  S4.4. determine the accuracy based on the plurality of error values.

The determining the accuracy based on the plurality of error values in S4.4 specifically includes the following steps:
  S4.4.1: obtain the sum of the plurality of error values, where the sum of the error values is the accuracy; or
  S4.4.2: obtain the average of the plurality of error values, where the average is the accuracy.

Figure 4:
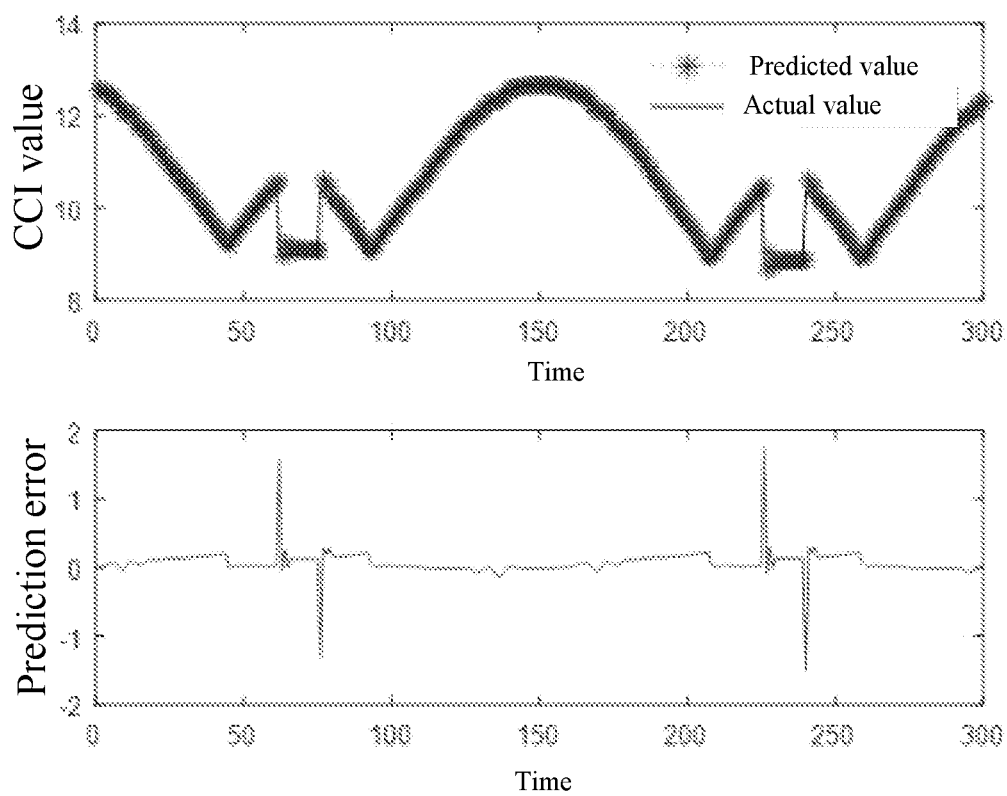
FIG. 4 is a diagram of a prediction result according to an embodiment of the present disclosure.

The first 500 CCI values in a unit time were selected for training. After the training, CCI values in a next unit time were predicted to obtain a predicted result shown in FIG. 4. It can be seen from the figure that a difference between the predicted result and an actual result can be stabilized within ±2 dB. Therefore, the accuracy is high, and an actual result requirement can be met.

Each embodiment of the present specification is described in a progressive manner, each embodiment focuses on the difference from other embodiments, and the same and similar parts between the embodiments may refer to each other.

In this specification, several examples are used for illustration of the principles and implementations of the present disclosure. The description of the foregoing embodiments is used to help illustrate the method of the present disclosure and the core principles thereof. In addition, a person of ordinary skill in the art can make various modifications in terms of specific implementations and scope of application in accordance with the teachings of the present disclosure. In conclusion, the content of the present specification shall not be construed as a limitation to the present disclosure.

What is claimed is:

1. A method for predicting co-channel interference (CCI) of a satellite-to-ground downlink under a low-orbit satellite constellation, comprising:

S1: obtaining CCI values in a first time period and CCI values in a second time period;
S2: constructing a CCI model based on the CCI values in the first time period and a dropout wavelet neural network (WNN);
S3: updating parameters of the CCI model;
S4: inputting the CCI values in the second time period into an updated CCI model to obtain accuracy;
S5: determining whether the accuracy is greater than an accuracy threshold; and if the accuracy is greater than the accuracy threshold, going back to "S2"; or if the accuracy is less than or equal to the accuracy threshold, outputting the updated CCI model; and
S6: predicting CCI values of each link at a next moment based on the updated CCI model.

2. The method for predicting CCI of a satellite-to-ground downlink under a low-orbit satellite constellation according to claim 1, wherein the obtaining CCI values in a first time period specifically comprises:
  S1.1: obtaining the CCI values in the first time period by using a satellite; or
  S1.2: obtaining the CCI values in the first time period through modeling.

3. The method for predicting CCI of a satellite-to-ground downlink under a low-orbit satellite constellation according to claim 2, wherein the obtaining the CCI values in the first time period through modeling specifically comprises:
  S1.2.1: analyzing a movement relationship between a satellite phased array and a terminal phased array to determine deviation angles, wherein the deviation angles comprise a deviation angle of each interference beam relative to a normal direction of the satellite phased array and a deviation angle of a receive antenna of the terminal phased array in a direction of each interference beam;
  S1.2.2: calculating a CCI value caused by each interference beam based on the deviation angles, wherein a specific formula is $$CCI_q(t) = P_T \cdot G_{ls}(\varphi_{q1}(t)) \cdot G_{re}((\varphi_{q2}(t)) \cdot (d_q(t))^{-\alpha} \quad (1), \text{wherein}$$

$CCI_q(t)$ denotes a CCI value caused by a qth interference beam, $P_T$ denotes transmit power of a satellite that can generate an interference beam, $\varphi_{q1}(t)$ denotes a deviation angle of the qth interference beam relative to the normal direction of the satellite phased array, $\varphi_{q2}(t)$ denotes a deviation angle of the receive antenna of the terminal phased array in a direction of the qth interference beam, $G_{ls}(\varphi_{q1}(t))$ denotes an off-axis gain of a transmit antenna of the satellite that can generate an interference beam, $G_{re}(\varphi_{q2}(t))$ denotes an off-axis gain of the receive antenna of the terminal phased array, $d_q(t)$ denotes a distance from the qth interference beam of the satellite phased array to the terminal phased array, and $\alpha$ denotes a spatial attenuation factor;
  S1.2.3: calculating the sum of CCI values caused by all interference beams, and determining CCI values that are caused by all interference beams and that are received by a target beam, wherein a specific formula is $$CCI(t) = \sum_{q=1}^{N} CCI_q(t). \quad (2)$$

wherein
N denotes the total number of interference beams; and
S1.2.4: saving the CCI values that are caused by all interference beams and that are received by the target beam as an array, that is, the CCI values in the first time period are $X=(x_1, x_2, \ldots, x_n)^T$, wherein $x_1=CCI(t_0)$, $x_2=CCI(t_0+\Delta t)$, and similarly, $x_n=CCI(t_0+(n-1)\Delta t)$;
$t_0$ denotes an initial moment, n denotes the total number of CCI values in the first time period, $\Delta t$ denotes a sampling time, and $CCI(t_0+(n-1)\Delta t)$ denotes CCI values that are caused by all interference beams and that are received by the target beam at moment $t_0+(n-1)\Delta t$.

4. The method for predicting CCI of a satellite-to-ground downlink under a low-orbit satellite constellation according to claim 3, wherein the constructing a CCI model based on the CCI values in the first time period and a dropout WNN specifically comprises:
S2.1: establishing an input layer, a hidden layer, and an output layer based on a dropout three-layer WNN;
S2.2: initializing the total number l of hidden-layer nodes, the total number m of output-layer nodes, a dropout probability p, a connection weight $v_i$, corresponding to a jth hidden-layer node, between an input-layer neuron and a hidden-layer neuron, a connection weight $w_j$, corresponding to a kth output-layer node and the jth hidden-layer node, between the hidden-layer neuron and an output-layer neuron, a hidden-layer threshold $\alpha_i$ corresponding to the jth hidden-layer node and an ith input-layer node, and an output-layer threshold $b_j$ corresponding to the kth output-layer node and the jth hidden-layer node, and initializing a learning rate $\eta$ and a neuron excitation function $f(x)=e^{-x^2/2}\cos(1.75x)$, using $X=(x_1, x_2, \ldots, x_n)$ as input;
S2.3: determining an input quantity corresponding to each hidden-layer node based on the CCI values in the first time period, wherein a specific formula is $$net_j = \sum_{i=1}^{n}(v_i \cdot x_i + a_i), \; j = 1, 2, \cdots, l, \quad (3)$$

$net_j$ denotes an input quantity corresponding to the jth hidden-layer node, $x_i$ denotes the ith CCI value corresponding to the jth hidden-layer node, and n denotes the total number of CCI values in the first time period;
S2.4: calculating an actual output quantity corresponding to each hidden-layer node, wherein a specific calculation formula is $$y_j = f(net_j) = e^{-net_j^2/2} \cdot \cos(1.75 net_j), \quad (4)$$

wherein
$y_j$ denotes an actual output quantity corresponding to the jth hidden-layer node;
S2.5: calculating an input quantity corresponding to each output-layer node, wherein a specific formula is $$\begin{cases} \tilde{y}_j = r_j * y_j \\ net_k = \sum_{j=1}^{l}(w_j \cdot \tilde{y}_j + b_j), \; k = 1, 2, \cdots, m \end{cases} \quad (5)$$

wherein
$\tilde{y}_j$ denotes a dropout output quantity, $r_j$ denotes a vector of 0 and 1 randomly generated with probability p, and $net_k$ denotes an input quantity corresponding to the kth output-layer node; and
S2.6: calculating an actual output quantity corresponding to each output-layer node, wherein the actual output quantity corresponding to the output-layer node is a predicted CCI value, and
a specific formula for calculating the actual output quantity corresponding to each output-layer node is:

$$o_k = f(net_k) = e^{-net_k^2/2} \cdot \cos(1.75 \; net_k), \quad (6)$$

wherein
$o_k$ denotes the actual output quantity corresponding to the kth output-layer node, that is, a kth predicted CCI value.

5. The method for predicting CCI of a satellite-to-ground downlink under a low-orbit satellite constellation according to claim 4, wherein the updating parameters of the CCI model specifically comprises:
S3.1: calculating an output error corresponding to each CCI value, wherein a specific formula is $e_k = d_k - o_k$ (7), wherein $e_k$ denotes an output error corresponding to a kth CCI value, and $d_k$ denotes the kth CCI value; and
S3.2: updating $v_i$, $w_j$, $\alpha_i$, and $b_j$ based on the output error $e_k$, wherein a specific formula $$\begin{cases} v'_i = v_i + \eta \cdot y_j(1-y_j)x_i\sum_{j=1}^{m} w_j \cdot e_k \\ w'_j = w_j + \eta \cdot y_j \cdot e_k \\ a'_i = a_i + \eta \cdot y_j(1-y_j)\sum_{j=1}^{m} w_j \cdot e_k \\ b'_j = b_j + e_k \end{cases} \quad (8)$$

wherein
$v'_i$ denotes an updated connection weight, corresponding to the jth hidden-layer node, between the input-layer neuron and the hidden-layer neuron, $w'_j$ denotes an updated connection weight, corresponding to the kth output-layer node and the jth hidden-layer node, between the hidden-layer neuron and the output-layer neuron, $\alpha'_i$ denotes an updated hidden-layer threshold corresponding to the jth hidden-layer node and the ith CCI value, and $b'_j$ denotes an updated output-layer threshold corresponding to the kth output-layer node and the jth hidden-layer node.

6. The method for predicting CCI of a satellite-to-ground downlink under a low-orbit satellite constellation according to claim 1, wherein the inputting the CCI values in the second time period into an updated CCI model to obtain accuracy specifically comprises:
S4.1: inputting the CCI values in the second time period into the updated CCI model to obtain predicted CCI values in a third time period;
S4.2: obtaining CCI values in the third time period;
S4.3: calculating differences between the CCI values in the third time period and the predicted CCI values in the third time period to obtain a plurality of error values; and
S4.4: determining the accuracy based on the plurality of error values.

7. The method for predicting CCI of a satellite-to-ground downlink under a low-orbit satellite constellation according to claim 6, wherein the determining the accuracy based on the plurality of error values specifically comprises:

54.4.1: obtaining the sum of the plurality of error values, wherein the sum of the error values is the accuracy; or S4.4.2: obtaining the average of the plurality of error values, wherein the average is the accuracy.

\* \* \* \* \*